United States Patent
Ishikawa et al.

(10) Patent No.: US 9,678,416 B2
(45) Date of Patent: Jun. 13, 2017

(54) LIGHT SOURCE DEVICE PROVIDED WITH COOLER AND IMAGE PROJECTION DEVICE INCLUDING LIGHT SOURCE DEVICE PROVIDED WITH COOLER

(71) Applicants: Naoyuki Ishikawa, Kanagawa (JP); Tetsuya Fujioka, Kanagawa (JP); Hideo Kanai, Tokyo (JP); Akihisa Mikawa, Kanagawa (JP); Masamichi Yamada, Kanagawa (JP); Yasunari Mikutsu, Tokyo (JP); Satoshi Tsuchiya, Kanagawa (JP); Yukimi Nishi, Tokyo (JP)

(72) Inventors: Naoyuki Ishikawa, Kanagawa (JP); Tetsuya Fujioka, Kanagawa (JP); Hideo Kanai, Tokyo (JP); Akihisa Mikawa, Kanagawa (JP); Masamichi Yamada, Kanagawa (JP); Yasunari Mikutsu, Tokyo (JP); Satoshi Tsuchiya, Kanagawa (JP); Yukimi Nishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 104 days.

(21) Appl. No.: 14/722,255

(22) Filed: May 27, 2015

(65) Prior Publication Data
US 2015/0370153 A1 Dec. 24, 2015

(30) Foreign Application Priority Data
Jun. 19, 2014 (JP) .................................. 2014-126151

(51) Int. Cl.
*G03B 21/16* (2006.01)
*G03B 21/20* (2006.01)

(52) U.S. Cl.
CPC ......... *G03B 21/16* (2013.01); *G03B 21/2006* (2013.01)

(58) Field of Classification Search
CPC ............................ G03B 21/16; G03B 21/2006
See application file for complete search history.

(56) References Cited

U.S. PATENT DOCUMENTS

| 8,511,834 B2 | 8/2013 | Kobayashi et al. |
| 2011/0026224 A1* | 2/2011 | Ioki .................... H05K 7/20972 361/695 |
| 2011/0051098 A1* | 3/2011 | Kobayashi ............. G03B 21/16 353/61 |
| 2013/0114054 A1 | 5/2013 | Ishikawa et al. |

FOREIGN PATENT DOCUMENTS

JP 5378112 12/2013

* cited by examiner

*Primary Examiner* — Sultan Chowdhury
*Assistant Examiner* — Magda Cruz
(74) *Attorney, Agent, or Firm* — IPUSA, PLLC

(57) ABSTRACT

Disclosed is a light source device including a light source that includes a light emitting tube; and a cooler configured to cool the light emitting tube. The cooler includes an inlet port for drawing cooling air for cooling the light emitting tube; a flow channel that extends from the inlet port to the light emitting tube in a horizontal direction and that is for flowing the cooling air toward the light emitting tube; and a baffle plate that is disposed in the flow channel and that can slide in a gravity direction. The baffle plate has a shape and openings such that, in an installation state, an upper portion of the flow channel is opened and a lower portion of the flow channel is closed by the shape and positions of the openings of the baffle plate.

6 Claims, 15 Drawing Sheets

LIGHT SOURCE DEVICE PROVIDED WITH COOLER AND IMAGE PROJECTION DEVICE INCLUDING LIGHT SOURCE DEVICE PROVIDED WITH COOLER

BACKGROUND OF THE INVENTION

1. Field of the Invention

The present invention relates to a light source device and an image projection device.

2. Description of the Related Art

For a light source device having a light emitting tube that is used for a projector (an image projection device) or the like, cooling of the light emitting tube may have been required. In the light emitting tube, due to an effect of heat convection, an increase in temperature of an upper portion is greater relative to that of a lower part with respect to a center line direction (i.e., a lower part with respect to the gravitation). Thus, a temperature difference tends to occur between the upper portion and the lower portion. Such a temperature difference can be a cause of breakage of the light emitting tube or a cause of degradation of the light emitting tube. For cooling a light emitting tube, it is desired that the upper portion is efficiently cooled relative to the lower portion so as to prevent a temperature difference between the upper portion and the lower portion from occurring. There are some image projection devices that can be used in two installation states. One installation state is a stationary installation state such that the image projection device is placed on a desk or the like and the image projection device is used. The other installation state is a hanging installation state such that the image projection device is hanging from a ceiling in an upside-down position and the image projection device is used.

A configuration of an image projection device has been known such that a baffle plate that rotates by its own weight is provided in a flow channel for flowing a cooling air current, so that an upper portion of a light emitting tube is efficiently cooled both in the stationary installation state and the hanging installation state. The baffle plate is for opening an upper side of the flow channel and for closing a lower side of the flow channel. Thus, a cooling air current can be guided to the upper portion (cf. Patent Document 1 (Japanese Patent No. 5378112), for example).

SUMMARY OF THE INVENTION

Patent Document 1 discloses the configuration such that the baffle plate for guiding the cooling air current to the upper portion of the light emitting tube can be rotated by its own weight. However, in the flow channel in which the baffle plate is provided, the flow of the cooling air current may not be symmetric in the vertical direction. That is because the flow of the cooling air current is unstable in the flow channel in which the baffle plate is provided. Thus, a cooling air current in one direction may be applied to a front side of the baffle plate, and at the same time, a portion of the cooling air current that flows backward (or the cooling air current that rotates around the baffle plate), as a result that the cooling air current is applied to the front side of the baffle plate, for example, may be applied to the rear side of the baffle plate. Then, the baffle plate may be rotated and lifted upwardly by the cooling air current that flows backward. Consequently, the upper portion of the light emitting tube may not be stably cooled.

There is a need for a light source device and an image projection device in which an upper portion of a light emitting tube can always be stably cooled.

According to an aspect of the present invention there is provided a light source device including a light source that includes a light emitting tube; and a cooler configured to cool the light emitting tube. The cooler includes an inlet port configured to draw cooling air for cooling the light emitting tube; a flow channel that extends from the inlet port to the light emitting tube in a horizontal direction and that is for flowing the cooling air toward the light emitting tube; and a baffle plate that is disposed in the flow channel and that is configured to slide in a gravity direction that is perpendicular to the direction in which the flow channel is extended. The baffle plate has a shape and openings such that, in an installation state, an upper portion of the flow channel is opened and a lower portion of the flow channel is closed by the shape and positions of the openings of the baffle plate.

According to an embodiment of the present invention a light source device and an image projection device can be provided that can always stably cool an upper portion of a light emitting tube.

Other objects, features and advantages of the present invention will become more apparent from the following detailed description when read in conjunction with the accompanying drawings.

DETAILED DESCRIPTION OF THE PREFERRED EMBODIMENTS

Figure 1:
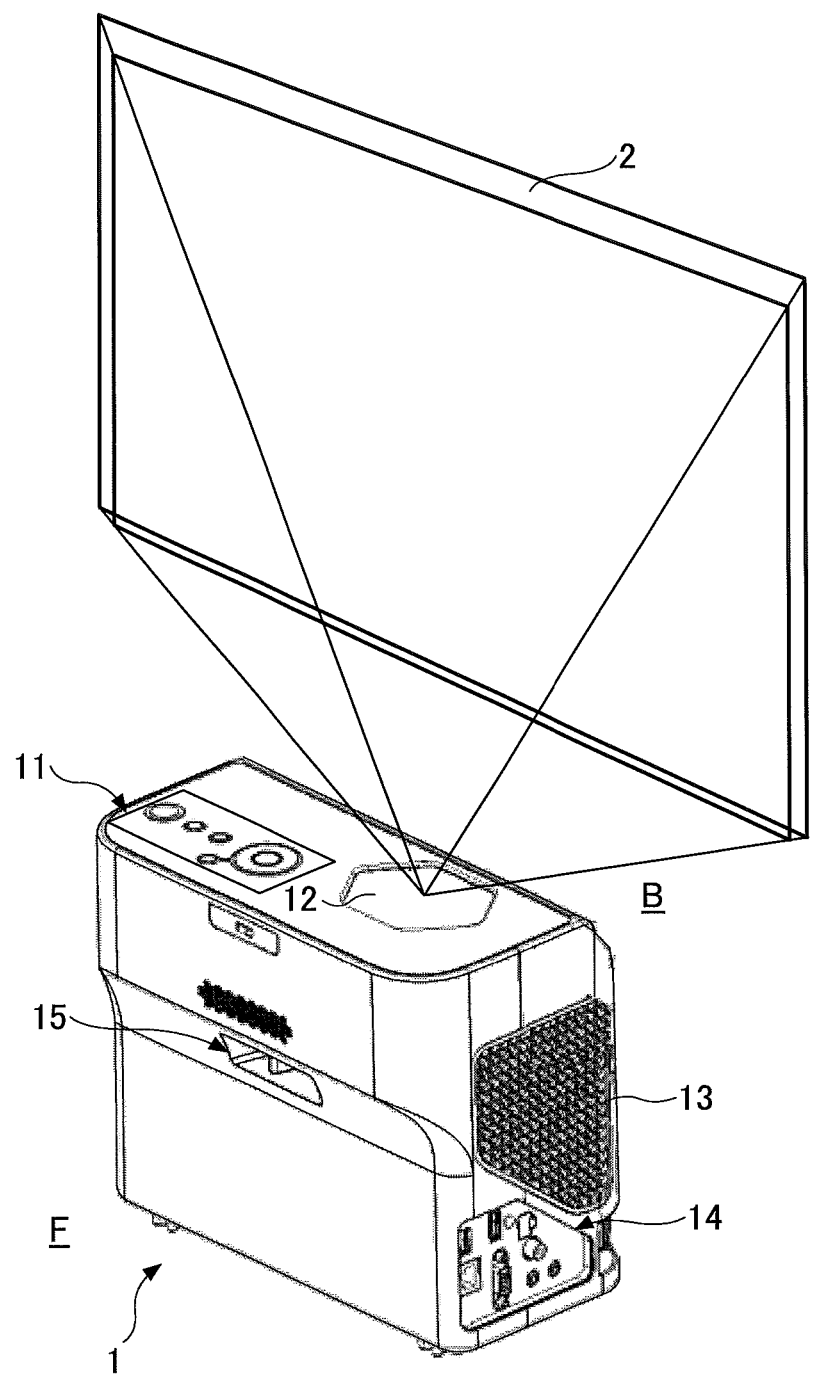
FIG. 1 is a perspective view of an image projection device according to an embodiment of the present invention.

There are explained a light source device and an image projection device including the light source device according to an embodiment of the present invention below. In the drawings, an identical reference numeral may be attached to the same components, and thereby duplicate explanations may be simplified or omitted. The drawings are not intended to show relative ratios among members or among components. Thus, a person skilled in the art can determine specific sizes of the members or the components, in consideration of the following non-limiting embodiment.

In the following explanation, the light source device according to the embodiment is included in the image projection device, and the light source device can operate in relation to various units that are included in the image projection device. Accordingly, in the following explanation, first the entire configuration of the image projection device is explained, and then the configuration of the light source device is specifically explained.

<Image Projection Device>

Figure 2A:
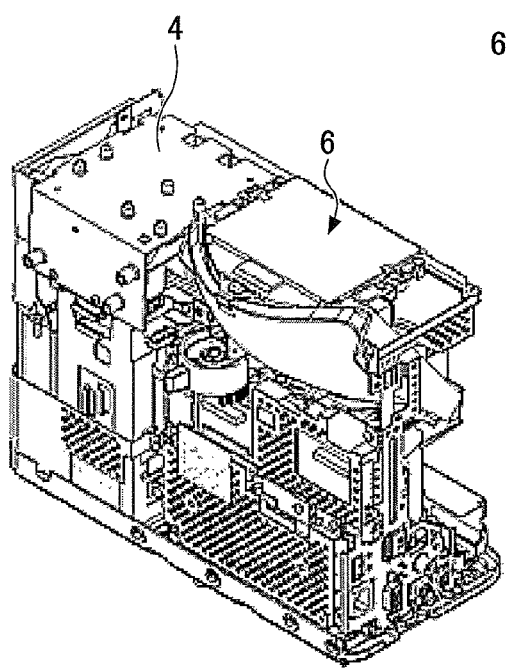
FIG. 2A is a perspective view of the image projection device when the image projection device is viewed from a front side.
Figure 2B:
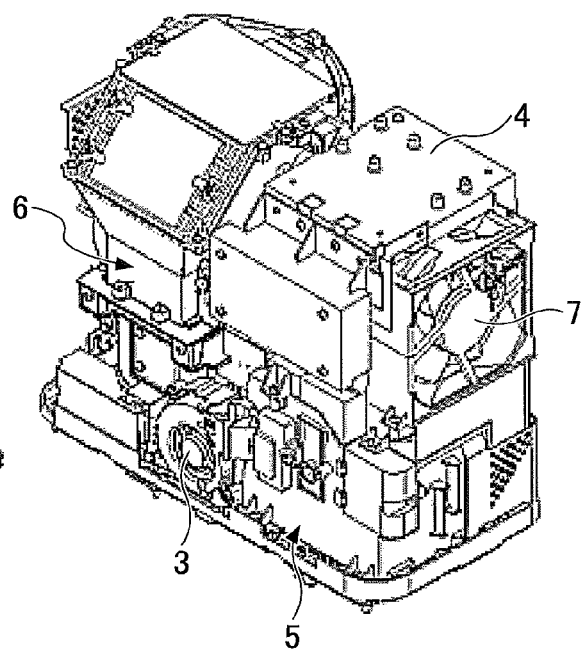
FIG. 2B is a perspective view of the image projection device when the image projection device is viewed from a rear side.

FIG. 1, FIG. 2A, and FIG. 2B shows an example of a schematic configuration of the image projection device 1 according to the embodiment of the present invention. FIG. 1 is a perspective view showing the schematic configuration of the image projection device 1 when the image projection device 1 projects an image. FIGS. 2A and 2B are diagrams showing an internal configuration of the image projection device 1 when a housing of the image projection device 1 is removed. FIG. 2A is a perspective view showing the internal configuration of the image projection device 1 when the image projection device 1 is viewed from a front side F in FIG. 1. FIG. 2B is a perspective view showing the internal configuration of the image projection device 1 when the image projection device 1 is viewed from a rear side B in FIG. 1.

The image projection device 1 can generate an image based on image data that may be input from a personal computer or a camcorder, for example. The image projection device 1 can display the generated image by projecting the generated image on a presentation medium, such as a screen 2. The image projection device 1 that is shown in FIGS. 1, 2A, and 2B is a front-type liquid-crystal projector. The image projection device 1 is a compact, lightweight projector that utilizes a digital micro-mirror device (DMD). The image projection device 1 may be of vertical type. However, the embodiment of the image projection device 1 is not limited to this.

The image projection device 1 may have a configuration such that an internal structure of the image projection device 1 is installed inside a housing 10. An operation part 11 and an image projection opening 12 may be provided on a top surface of the housing 10. An exhaust opening 13 and a connector unit 14 may be provided on a right side surface of the housing 10. Another exhaust opening (not shown in FIG. 1) may be provided on a left side surface of the housing 10. A focus adjustment unit 15 may be provided on a front surface of the housing 10.

As shown in FIG. 2, the image projection device 1 may include, at least, a cooling fan 3; a controller 4; a light source unit 5; and an optical engine 6, as a basic configuration. Additionally, components that are usually included in a liquid crystal projector (e.g., an exhaust fan 7) may be included in the image projection device 1. However, detailed explanations of these components are omitted here.

The cooling fan 3 is a fan for generating a cooling air current that is for cooling a light emitting tube of a light source unit (which is described below). The cooling fan 3 can be connected to the exhaust opening 13 through an air duct.

The controller 4 can execute various types of control in accordance with an instruction content that corresponds to an electric signal that is converted by a photosensor, or that corresponds to a signal from the operating part 11.

Figure 3:
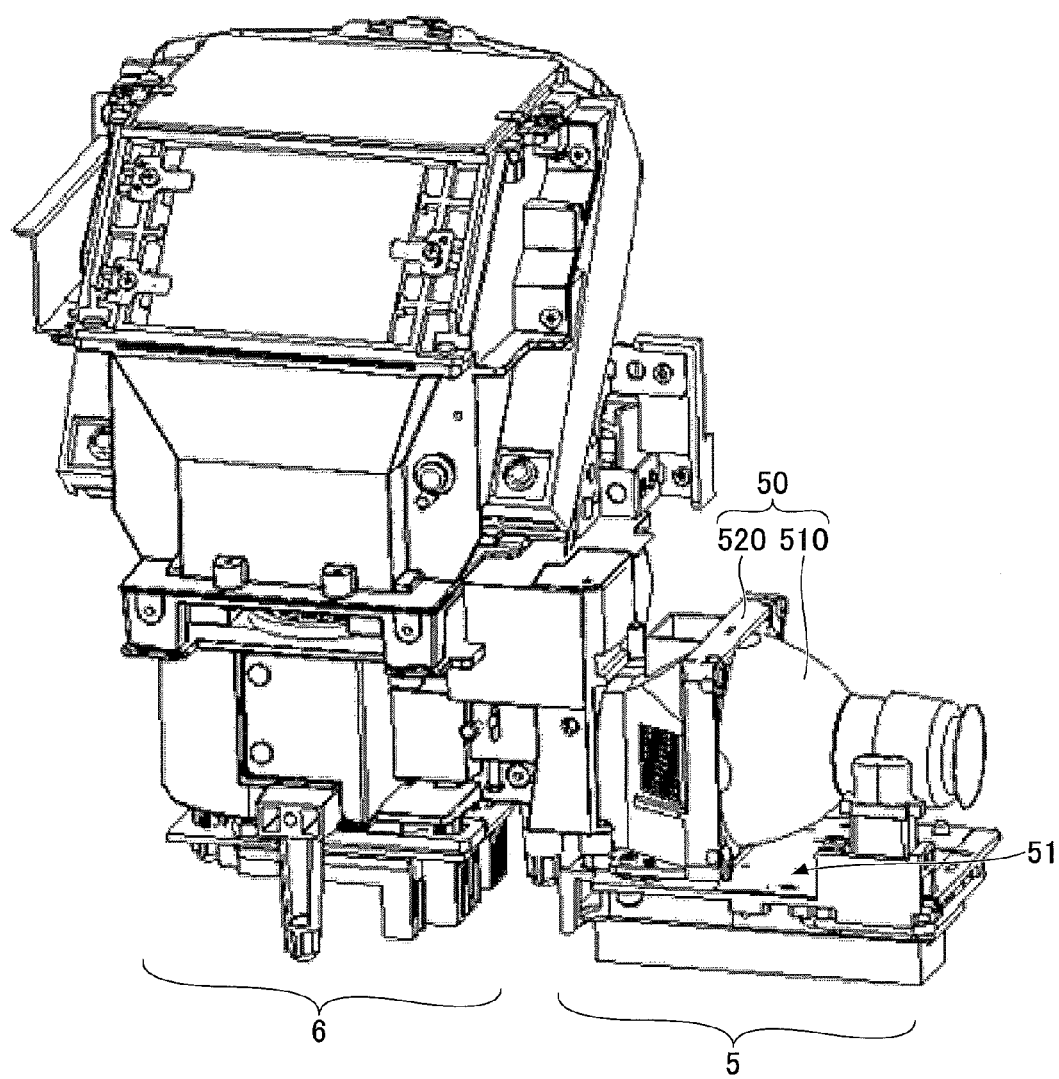
FIG. 3 is a perspective view showing a relationship between an optical engine and a light source unit.
Figure 4:
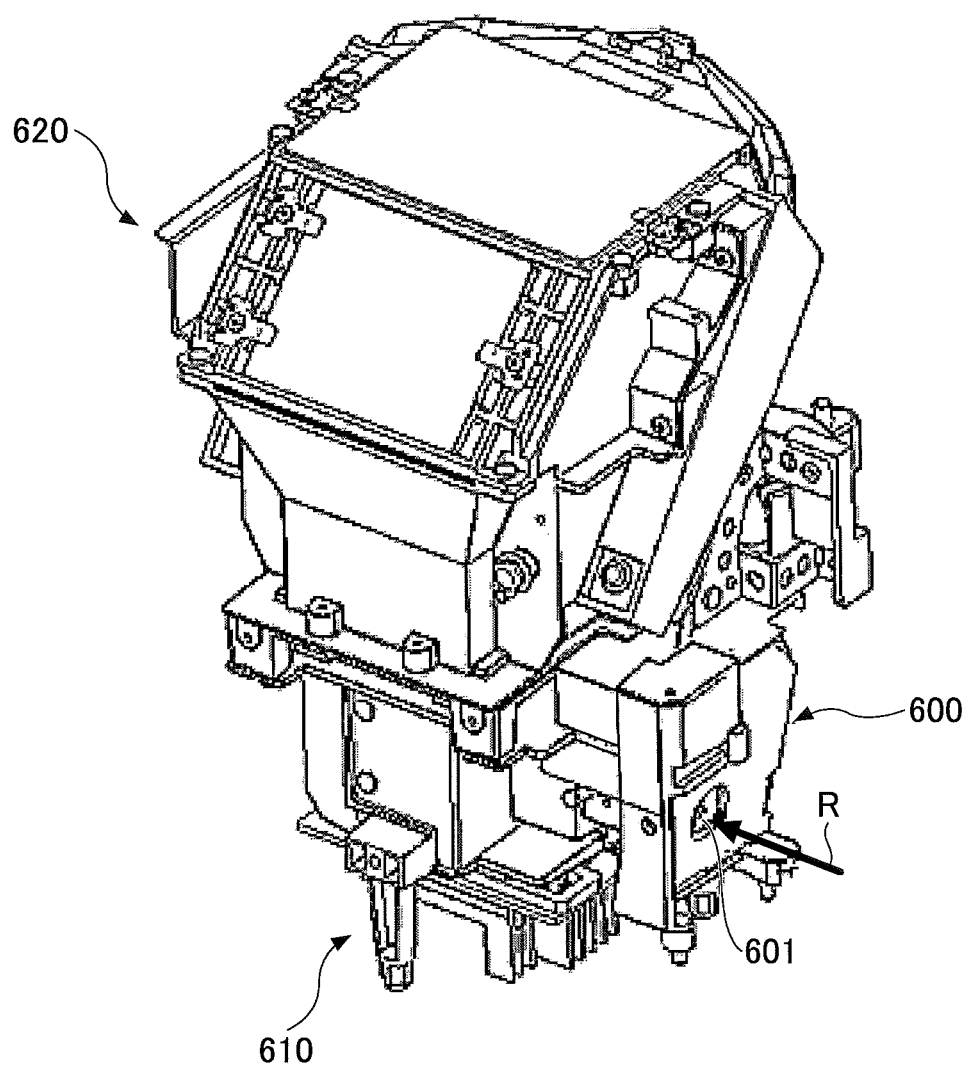
FIG. 4 is a perspective view showing a schematic configuration of the optical engine.

Next, the light source unit 5 and the optical engine 6 are explained by referring FIGS. 3 and 4. FIG. 3 shows the light source unit 5 and the optical engine 6 that are taken out of the image projection device 1. FIG. 4 shows only the optical engine 6 that is taken out of the image projection device 1.

The light source unit 5 may include a light source device 50; and a fixing plate 51. The light source device 50 may include a light source (lamp) 510 that includes a light emitting tube; and a cooler 520 (which is referred to as the "cooling device 520," hereinafter). The fixing plate 51 is for fixing the light source device 520. The light source unit 5 can have a function to irradiate the light from the light source 510 to the optical engine 6. The cooling device 520 can cool the light source 510. In addition, the cooling device 520 may include a fastener unit for fastening the light source 510 to the fixing plate 51.

As shown in FIG. 4, the optical engine 6 may include an irradiation optical system unit 600; an image display element unit (image forming unit) 610; and a projection optical system unit 620. The irradiation optical system unit 600 can diffract white light W that enters an optical entrance port 610 from the light source 510 into red light R, green light G, and blue light B (i.e., the three primary colors of light), and the irradiation optical system unit 600 can emit the red light R, the green light G, and the blue light G to the image display element unit 610. The image display element unit 610 can generate an image by modulating the light from the irradiation optical system unit 600 in accordance with image signals from an external device. The projection optical system unit 620 can enlarge the generated image, and the projection optical system unit 620 can project the generated image that is enlarged.

Figure 5:
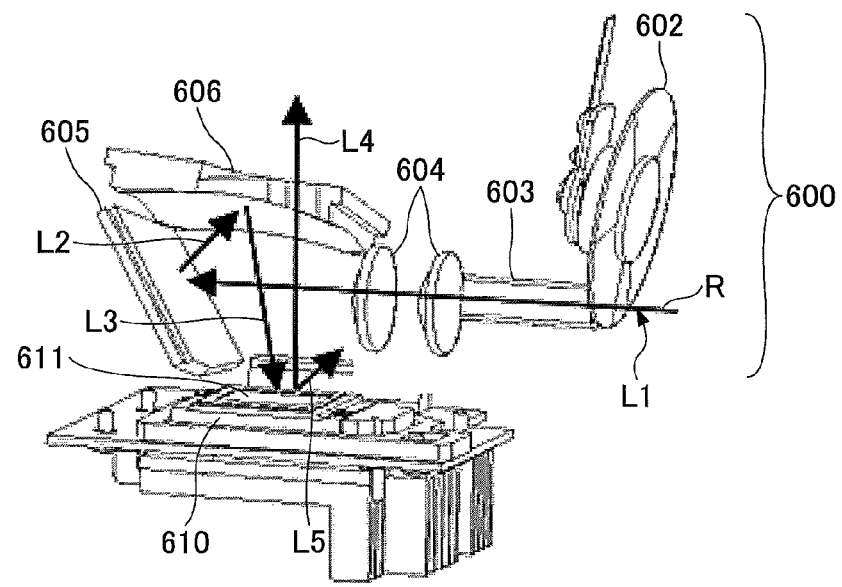
FIG. 5 is a diagram illustrating a schematic configuration of an illumination optical unit and an optical path.

FIG. 5 shows a specific configuration of the irradiation optical system unit 600 and an optical path. The irradiation optical system unit 600 may include a color wheel 602; an optical tunnel 603; relay lenses 604; a cylinder mirror 605; and a concave mirror 606.

Next, there are explained the functions of the above-described components and an optical path of the light that is emitted from the light source 510. First, the optical path L1 is explained.

The color wheel 602 can convert, by using a color filter having a disk-like shape, the white light W from the light source 510 into specific light such that a color of the specific light is cyclically switched at every unit time in an order of red (R), green (G), and blue (B). The optical tunnel 603 can be formed to have a square tube-like shape by gluing plate glass together. The optical tunnel 603 can guide the light from the color wheel 602. The relay lenses 604 may include two lenses. While correcting axial chromatic aberration of the light that is emitted from the optical tunnel 603, the relay lenses 604 can condense the light, thereby forming the optical path L1.

The cylinder mirror 605 can reflect the light emitted from the relay lenses 604 toward the concave mirror 606, thereby forming the optical path L2. The concave mirror 606 can reflect the light from the cylinder mirror 605 toward a DMD element 611 (cf. FIG. 6) of the image display element unit 610, thereby forming the optical path L3.

Figure 6:
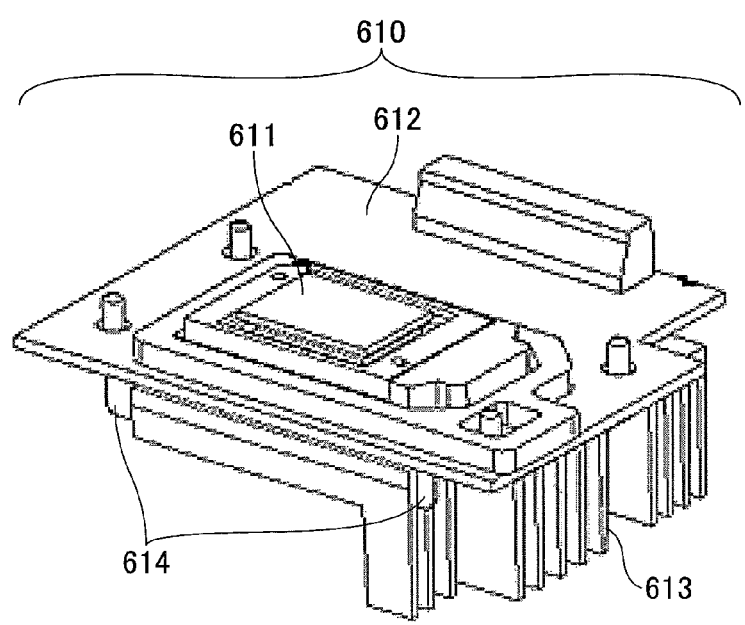
FIG. 6 is a perspective view showing a schematic configuration of an image display element unit.

Next, a specific configuration of the image display element unit 610 is explained by referring to FIG. 6. The image display element unit 610 may include the DMD element 611. Additionally, the image display element unit 610 may include a DMD printed circuit board 612; a heat sink 613; and a fixing plate 614.

The DMD element 611 may include a plurality of micromirrors. The DMD element 611 can reflect the light from the concave mirror 606 of the irradiation optical system unit 600 (i.e., the light through the optical path L3) by driving the micromirrors in a time-division manner so that an image (image light) based on image information can be generated. The DMD element 611 can reflect the light that is used for generating an image toward a projection lens 621 (cf. FIG. 7), thereby forming the optical path L4 (cf. FIG. 5). At the same time, the DMD element 611 can reflect the light to be discarded toward an OFF light plate 8 (cf. FIG. 8), thereby forming the optical path L5 (FIG. 5).

The DMD printed circuit board 612 is a circuit board for implementing the DMD element 611. The heat sink 613 may have a function for cooling the DMD element 611 and the DMD printed circuit board 612 as heat objects. The fixing plate 614 is a member for fixing the heat sink 613 to the DMD printed circuit board 612.

Figure 7:
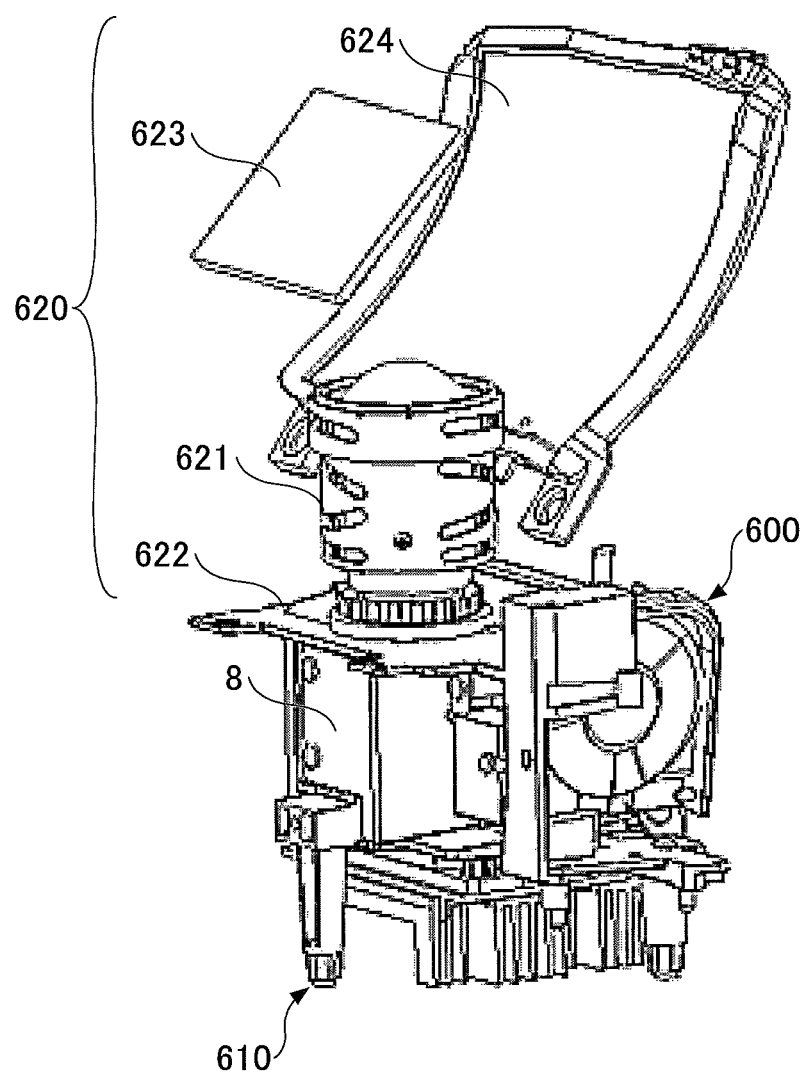
FIG. 7 is a perspective view showing a configuration of a projection optical system unit.
Figure 8:
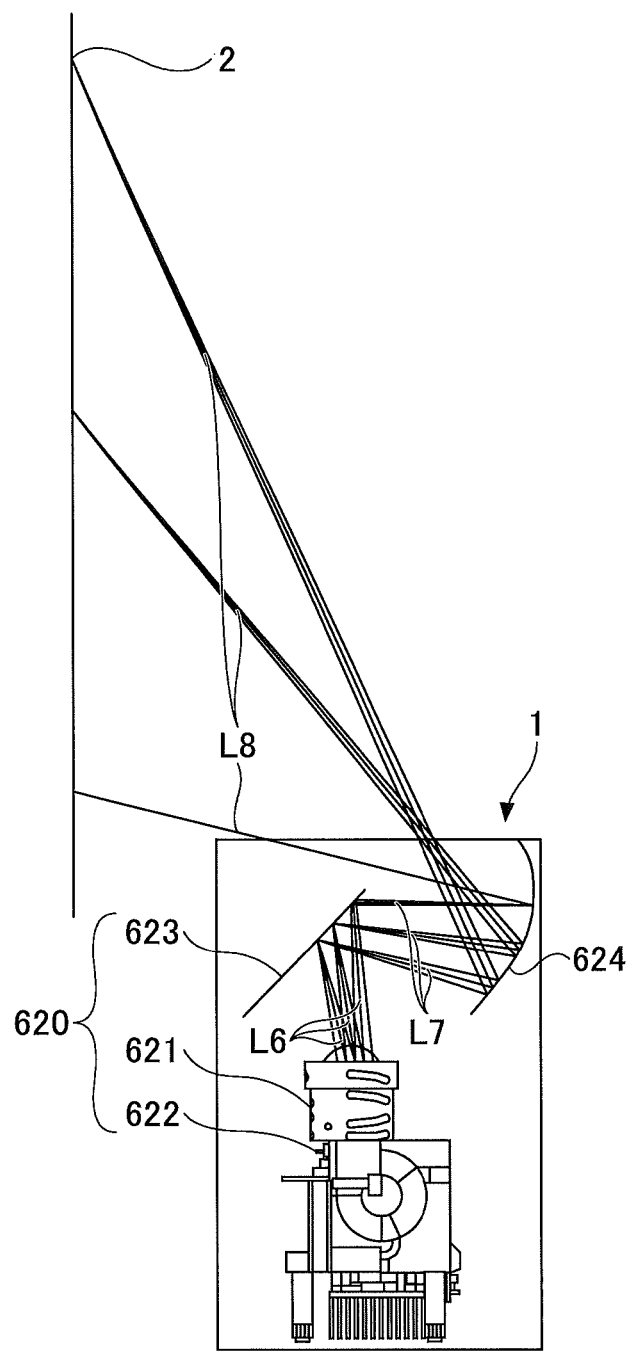
FIG. 8 is a diagram illustrating an optical path of the projection optical system unit.

Next, an example of a configuration of the projection optical system unit 620 is explained by referring to FIGS. 7 and 8. FIG. 7 shows a perspective view illustrating an example of the projection optical system unit 620. FIG. 8 is a diagram illustrating an optical path when the projection optical system unit 620 projects an image onto a screen 2.

The projection optical system unit 620 may include the projection lens 621; a lighting housing 622 for supporting the projection lens 621; a folding mirror 623; and a free-curved surface mirror 624. As shown in FIG. 8, the folding mirror 623 can form an optical path L7 by folding an optical path L6 of image light that is enlarged by the projection lens 621. The free-curved surface mirror 624 can form an optical path L8 by reflecting and enlarging the optical path L7 of the image light from the folding mirror 623. The screen 2 can receive, through the optical path L8, the image light from the free-curved surface mirror 624, and the enlarged image can be displayed on the screen 2. The projection optical system unit 620 with the above-described configuration is a so-called "ultra short focus optical system."

By including the image projection optical system unit 620 that is the "ultra short focus optical system" in the image projection device 1 according to the embodiment, the image projection device 1 can be arranged in vicinity of the above-described screen 2. In this manner, the image projection device 1 can be designed to be a compact vertical-type image projector with a small installation area.

Note that the projection lens 621 can receive the light (through the optical path L4) that is reflected from the DMD element 611 of the image display element unit 610 and that is used for forming the image. The OFF light plate 8 that is disposed at a position below the lighting housing 622 has a configuration for receiving the light that is reflected by the DMD element 611 and that is to be discarded (the optical path L5).

<Light Source Device>

Figure 9:
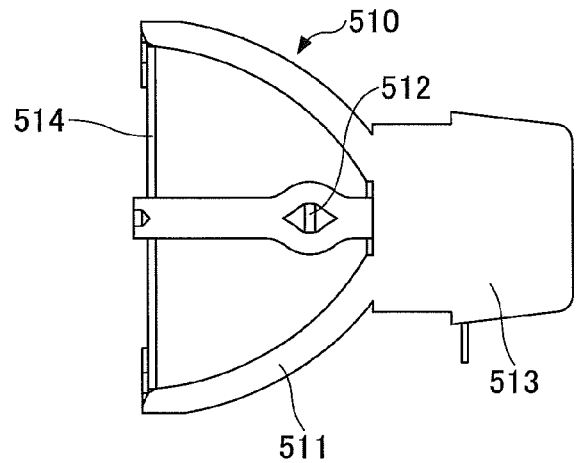
FIG. 9 is a vertical sectional view of a light source.

Next, the light source device 50 according to the embodiment of the present invention is explained by referring to the drawings. As simply explained by referring to FIGS. 2A, 2B, and 3, the light source device 50 may include the light source 510; and the cooling device 520. FIG. 9 is a vertical cross sectional view showing the light source 510 that is included in the light source device 50. The light source 510 may include a reflector 511; a light emitting tube (a bulb) 512; a seal portion 513; and a lid member 514. For longer life of the light source 510, a standard value of the temperature during lighting of the light source 510 may be defined within a predetermined temperature range. As the light emitting tube 512, a high-pressure mercury lamp, an ultra-high-pressure mercury lamp, or a metal halide lamp can be adopted, for example.

When the light emitting tube 512 emits light, the light emitting tube 512 is heated. In this case, by the effect of heat convection, the temperature increase of the upper portion of the light emitting tube 512 with respect to the center line (the upper portion with respect to the gravity) is greater than that of the lower portion (the lower portion with respect to the gravity). Thus, a temperature difference tends to occur between the upper portion and the lower portion. Especially, the temperature in the vicinity of the top surface of the light emitting tube 512 tends to increase. Thus, for cooling the light emitting tube 512, the upper portion may be preferentially cooled relative to the lower portion, so that the temperature difference between the upper portion and the lower portion may not be caused. In other words, the temperature difference can be prevented from occurring by applying a greater amount of the cooling air to the upper portion.

In this case, however, it is to be considered that the upper portion of the light emitting tube 512 (the upper side of the light emitting tube 512 in the direction of the gravity) that is included in the image projection device 1 can be switched depending on the installation state of the image projection device 1. Namely, as shown in FIGS. 10A and 10B, the image projection device 1 can be used in the installation states that include the normal projection state (which may correspond to the above-described stationary installation state) and the hanging projection state, for example.

Figure 10A:
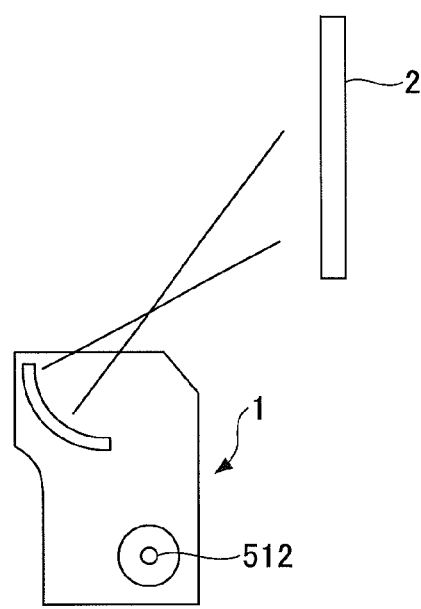
FIG. 10A is a diagram illustrating a normal projection state of the image projection device.

Specifically, the normal projection state is a state for projecting an image diagonally upward toward the screen 2 that is the vertical surface (cf. FIG. 10A). The hanging projection state is a state for projecting an image diagonally downward toward the screen 2 by turning the image projection device 1 upside-down (cf. FIG. 10B).

Figure 10B:
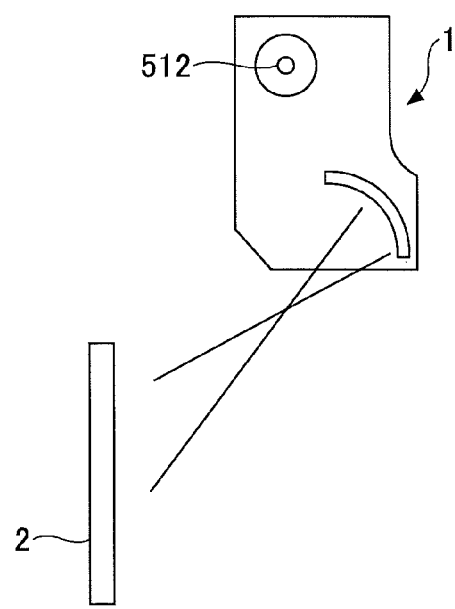
FIG. 10B is a diagram illustrating a hanging projection state.

As clearly understood by FIGS. 10A and 10B, in the light source device 50, a portion that is to be placed at the upper portion of the light emitting tube 512, namely, the portion that is to become a high temperature portion of the light emitting tube 512 is to be switched depending on the installation state of the light source device 50.

Thus, in order to elongate the life of the light emitting tube 512, the upper portion (the high temperature portion) of the light emitting tube 512 may be required to be cooled, regardless of the installation position of the image projection device (which includes the light source device 50). Hereinafter, in view of the above-described points, a specific configuration of the light source device 50 is explained. Especially, the light source device 50 is explained by mainly focusing on the configuration of the cooling device 520 that is included in the light source device 50.

Embodiment

Figure 11:
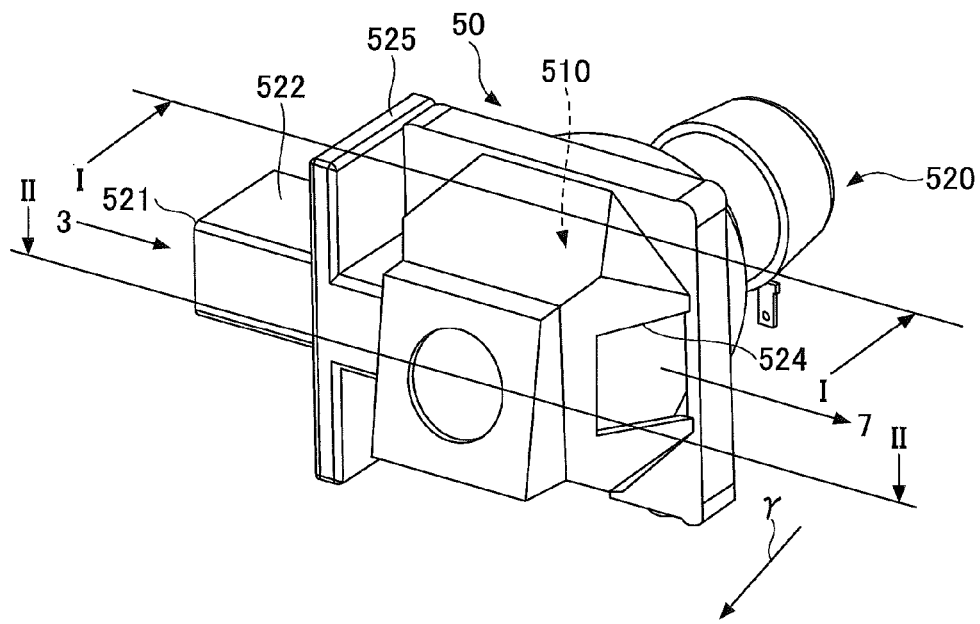
FIG. 11 is a front perspective view in a projection direction of the light source device according to the embodiment in the normal projection state.
Figure 12:
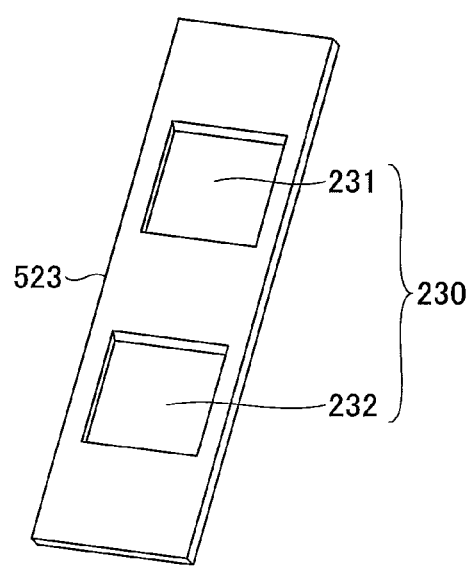
FIG. 12 is a perspective view showing a configuration of a baffle plate that is included in the light source device according to the embodiment.
Figure 13:
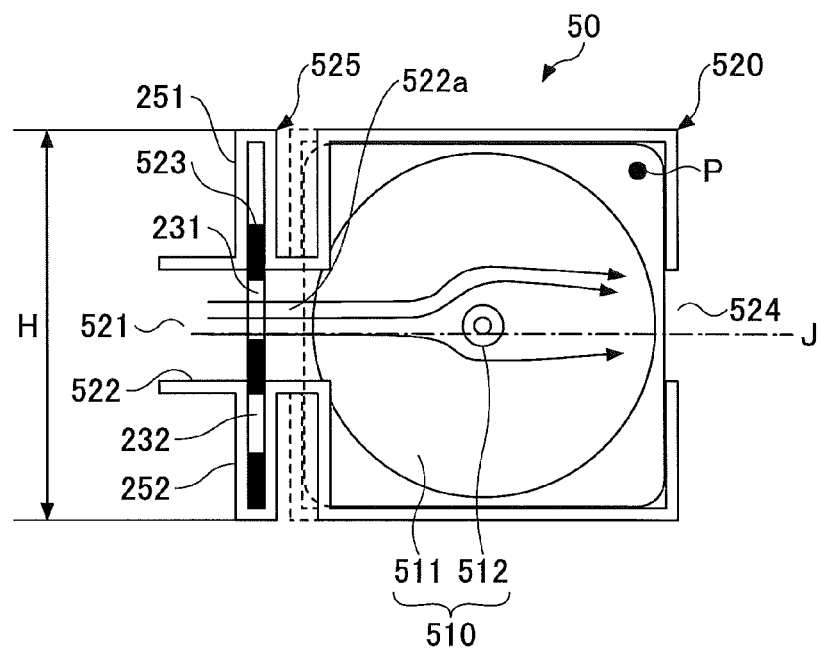
FIG. 13 is a vertical cross-sectional view of the light source device when the light source device is viewed in a direction that is indicated by I in FIG. 11.

Next, a specific configuration of the light source device 50 according to an embodiment is explained by referring to FIGS. 11 to 13. FIG. 11 is a perspective view of the light source device 50 during the normal projection state. To be more precisely, FIG. 11 is a perspective view of the light source device 50 that is viewed from a position in front of the light source device 50 in a projection direction γ. FIG. 12 is a perspective view showing a baffle plate 523 that is included in the cooling device 520. FIG. 13 shows a vertical cross-sectional view of the light source device 50 in the normal projection state that is viewed in a direction indicated by I in FIG. 11, that is, when the light source device 50 is viewed in a direction opposite to the projection direction γ.

An inlet port 521 that is formed on a left side surface of the cooling device 520 can be connected to the cooling fan 3 (cf. FIG. 2B). The exhaust port 524 that is formed on a right surface of the cooling device 520 can be connected to the exhaust fan 7.

It can be said that the light source device 50 according to the embodiment is particularly characterized in the cooling device 520. Namely, the cooling device 520 that is included in the light source device 50 may include the inlet port 521 for drawing in cooling air for cooling the light emitting tube 512; and a flow channel 522 that extends from the inlet port 521 to the light emitting tube 512 in the horizontal direction. The flow channel 522 is for flowing the cooling air toward the light emitting tube 512. Additionally, the cooling device 520 may include the baffle plate 523; and the exhaust port 524. The baffle plate 523 can be slid in the gravity direction that is perpendicular to the direction in which the flow channel 522 is extended. The exhaust port 524 can be used for exhausting the cooling air that is used for cooling the light emitting tube 512 from the light source device 50. The baffle plate 523 may be formed of a resin (e.g., a liquid crystal polymer (LCP)) or a metal. The baffle plate 523 may have a thickness of from 1 to 2 mm.

As shown in FIG. 12, the above-described baffle plate 523 may include an opening portion 230. The opening portion 230 may include an opening 213 that is provided in an upper side of the baffle plate 523; and an opening 232 that is provided in a lower side of the baffle plate 523.

The baffle plate 523 having the above-described configuration can be accommodated in a support member 525, so that the baffle plate 523 can be slid in the gravitation direction by its own weight. The support member 525 can be provided in a state such that the support member 525 protrudes upward and downward in the direction that is perpendicular to the direction in which the flow channel 522 is extended. The support member 525 can preferably be disposed in the vicinity of an opening edge 522a of the flow channel 522 at a side of the light emitting tube 512 (i.e., at an upstream side).

The baffle plate 523 can be accommodated inside the support member 525, and the baffle plate 523 may have a shape such that, in the normal projection state that is shown in FIG. 13, the opening 231 at the upper side of the baffle plate 523 may open the upper side of the opening edge 522a of the flow channel 522, and the baffle plate 523 may close the lower side of the opening edge 522a. Note that the position of the opening 231 can be determined by a position of the baffle plate 523 that is in contact with the bottom portion of the support member 525. Thus, the support member 525 may preferably have a height H such that the opening 231 of the baffle plate 523 opens the upper side of the opening edge 522a of the flow channel 522 at the side of the light emitting tube 512, and the baffle plate 523 closes the lower side of the opening edge 522a of the flow channel 522 at the side of the light emitting tube 512.

Similarly, the baffle plate 523 may have the shape such that, when the baffle plate 523 slides upon the projection state is changed to the hanging projection state of the image projection device 1, the opening 232 at the lower side of the baffle plate 523 may open the upper side of the opening edge 522a of the flow channel 522, and the baffle plate 523 may close the lower side of the opening edge 522a. For example, when fine-tuning is required to adjust the height position of the baffle plate 523, a cushioning material may be provided on the bottom surface of the support member 525, and the fine-tuning can be executed by raising the height position of the baffle plate 523.

Though it is not shown in the figures, a height adjustment unit for adjusting the position of the baffle plate 523 in the vertical direction may be preferably provided at the bottom portion of the support member 525. The height adjustment unit may be implemented by a configuration in which a slide bottom and a fastening unit are combined, for example. During adjustment, a slit may be provided that opens in the vertical direction on the lower side surface of the support member 525, the position of the slide bottom can be adjusted through the slit, and the slide bottom can be fastened by the fastening unit. However, the embodiment is not limited to this.

With the above-described configuration, the cooling fan 3 can send the cooling air to the inlet port 521, the cooling air can flow inside the flow channel 522, and the cooling air can be guided from the opening edge 522a of the flow channel 522 to the lighting tube 512 of the light source 510. In this manner, the lighting tube 512 can be cooled.

At that time, as shown in FIG. 13, the cooling air can pass through the opening 231 at the upper side of the baffle plate 523 in the flow channel 522. Thus, among an amount of the cooling air that is conveyed to the light emitting tube 512, an amount of the cooling air that is guided to the upper side of the light emitting tube 512 (i.e., the side that is in a direction that is opposite to the direction of the gravity) is greater than an amount of the air that is guided to the lower side of the light emitting tube 512. Therefore, the upper portion of the light emitting tube 512 can be significantly cooled compared to the lower portion of the light emitting tube 512. After cooling the light emitting tube 512, the cooling air can be exhausted outside the light source device 50 through the exhaust port 524. Note that the direction of the gravity is the direction from an upper portion to a lower portion in FIG. 13.

In view of the above-described action, the position J in the height direction of the lower side of the opening 231 of the baffle plate 523 that is disposed inside the support member 525 may preferably adjusted so that the position J is placed above the lower end (in the direction of the gravity) of the light emitting tube 512.

Figure 14:
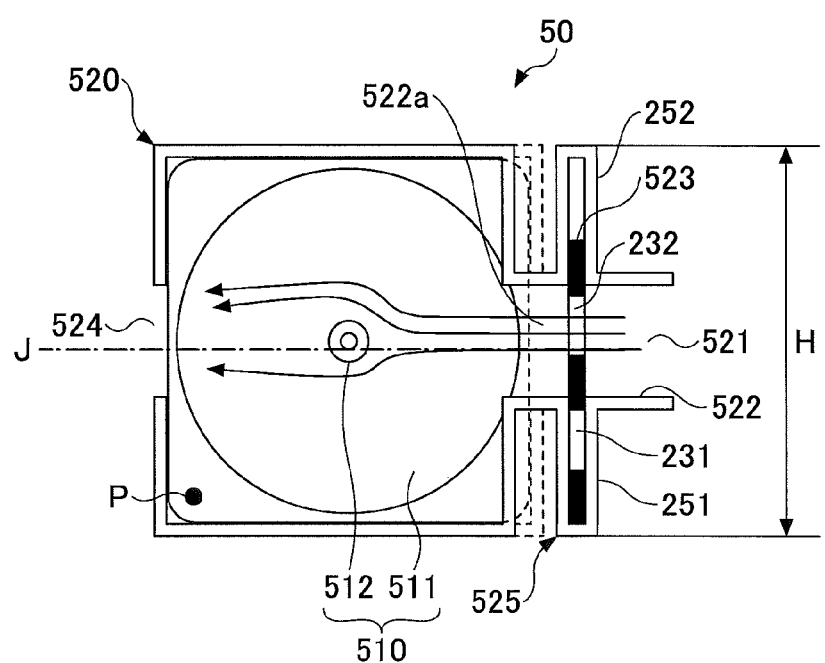
FIG. 14a vertical cross-sectional view of the light source device that is shown in FIG. 11 and that is in the hanging projection state when the light source device is viewed in the direction that is indicated by I in FIG. 11.

FIG. 14 shows the light source device 50 that is in the hanging installation state. More specifically, FIG. 14 shows a vertical cross-sectional view of the light source device 50 that is shown in FIG. 11 and that is in the hanging projection state when the in the direction indicated by I, that is, when the light source device 50 is viewed in the direction opposite to the projection direction γ.

The light source device 50 of FIG. 14 looks as if the light source device 50 of FIG. 13 were reversed in the horizontal direction. However, as it can be understood by focusing on the position of the mark P that indicates the top and bottom of the light source device 50, the light source device 50 of FIG. 14 is in the upside-down position relative to the position of the light source device 50 that is shown in FIG. 13, and FIGS. 13 and 14 show the same cross-section.

When the image projection device 1 is set to the hanging installation state, the baffle plate 523 slides in the direction of the gravity (i.e., the downward direction) by its own weight. Then, the opening 232 (at the lower side) of the baffle plate 523 opens the upper side of the opening edge 522a of the flow channel 522 at the side of the light emitting tube.

Then, the cooling fan 3 sends the cooling air to the inlet port 521, the cooling air flows in the flow channel 522, and the cooling air is guided from the opening edge 522a to the light emitting tube 512 of the light source 510. In this manner, the light emitting tube 512 can be cooled by the cooling air.

At this time, the cooling air passes through the opening 232 (at the lower side) of the baffle plate 523 in the flow channel 522. Thus, among an amount of the cooling air that is conveyed to the light emitting tube 512, an amount of the cooling air that is conveyed to the upper portion (i.e., the side that is in a direction that is opposite to the direction of the gravity) of the light emitting tube 512 is greater than the amount of the cooling air that is conveyed to the lower portion of the light emitting tube 512. Therefore, the upper portion of the light emitting tube 512 can be significantly cooled compared to the lower portion of the light emitting tube 512. After cooling the light emitting tube 512, the cooling air can be exhausted outside the light source device 50 through the exhaust port 524.

As described above, the light source device 50 according to the embodiment can have a configuration such that the baffle plate 523 is provided in the flow channel 522 for flowing cooling air, and the baffle plate 523 can slid by its own weight in a direction that is perpendicular to the direction in which the flow channel 522 extends. Further, the baffle plate 523 can include openings that correspond to installation positions of the image projection device 1, respectively. In one of the installation positions, one of the openings that corresponds to the one of the installation positions can open the upper portion of the opening edge 522a of the flow channel 522, and the baffle plate 523 can close the lower portion of the opening edge 522a of the flow channel 522. Therefore, the light emitting tube 512 can always be stably cooled regardless of the installation state of the image projection device 1. In particular, the upper portion of the light emitting tube 512 can be more effectively cooled in both the installation states, which are the normal projection state and the hanging projection state, of the image projection device 1.

Another Embodiment

Next, the light source device 50 according to another embodiment is explained. The light source device 50 according to this embodiment may have substantially the same configuration as that of the above-described configuration. Thus, only the differences from the above-described configuration are explained. It can be said that the light source device 50 according to this embodiment is also characterized in the cooling device 520.

Figure 15:
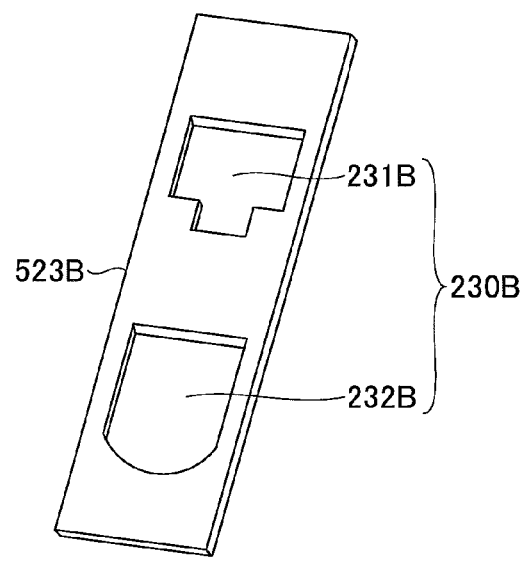
FIG. 15 is a perspective view showing an example of the baffle plate that is included in the light source device according to another embodiment.

The light source device 50 according to this embodiment is different from the above-described configuration in a baffle plate 523B that can slide by its own weight in a direction that is perpendicular to the direction in which the flow channel 522 extends. Specifically, as shown in FIG. 15, a shape of an opening portion 230B of the baffle plate 523B is different from the shape of the opening portion 230 of the baffle plate 523. The baffle plate 523B that is shown in FIG. 15 may include an opening 231B at the upper side; and an opening 232B at the lower side. The opening 231B at the upper side may have a substantially rectangular shape but the width at the lower portion of the rectangular shape is smaller than the width at the upper portion of the rectangular shape (in other words, the lower edge of the opening 231B includes a small rectangular portion that protrudes downward). The lower edge of the opening 232B at the lower side may have a curved shape that is convex downward.

In general, the cooling air that flows in the flow channel 522 may not be symmetric in the vertical direction. Therefore, the way of applying the cooling air to the light emitting tube 512 may be adjusted depending on whether the image projection device 1 is in the normal projection state or in the hanging projection state. The shapes of the above-described opening 213B at the upper side and opening 232B at the lower side can be designed by considering this point. As shown in FIG. 15, by designing the opening 231B at the upper side and the opening 232B at the lower side so that they have shapes that are different from each other, an area for closing the opening edge 522a of the flow channel 522 can be properly controlled for each of the normal projection state and the hanging projection state. In this manner, the cooling air that is to be conveyed to the light emitting tube 512 can be controlled. Namely, a configuration is disclosed such that an area for opening (the upper portion of) the opening edge 522a of the flow channel 522 can be properly switched depending on the installation state of the image projection device 1.

Namely, in the normal projection state, if the lower edge portion of the opening 231B at the upper side has the convex shape that is shown in FIG. 15, for example, cooling of the lower side of the light emitting tube 512 can be narrowed only in the vicinity of the center portion of the light emitting tube 512. In this manner, the upper side of the light emitting tube 512 can be intensively cooled. In the hanging projection state, if the lower edge portion (which is the upper edge portion during the hanging projection state) of the opening 232B at the lower side has the curved shape that is shown in FIG. 15, for example, an amount of the cooling air that goes around the light emitting tube 512 toward the upper portion of the light emitting tube 512 can increase. Thus, the upper portion of the light emitting tube 512 can be intensively cooled.

Additionally, the configuration that is described below can be used together with the above-described configuration, as a configuration for adjusting the way of applying the cooling air to the light emitting tube 512 depending on whether the installation state of the image projection device 1 is the normal projection state or the hanging projection state.

The support member 525 that is shown in FIG. 13 may include two recessed portions 251 and 252 that protrude in a direction that is perpendicular to the upper and lower surfaces of the flow channel 522. By differentiating the height (depth) of the recessed portion 251 at the upper side from the height (depth) of the recessed portion 252 at the lower side so that the height of the recessed portion 251 matches the shape of the opening 231B at the upper side and the height of the recessed portion 252 matches the shape of the opening 232B at the lower side, a finer adjustment can be made.

Further, this embodiment is different from the above-described embodiment in that an air guide plate 526 is provided in the vicinity of the opening edge 522a that is located downstream the flow channel 522.

Figure 16:
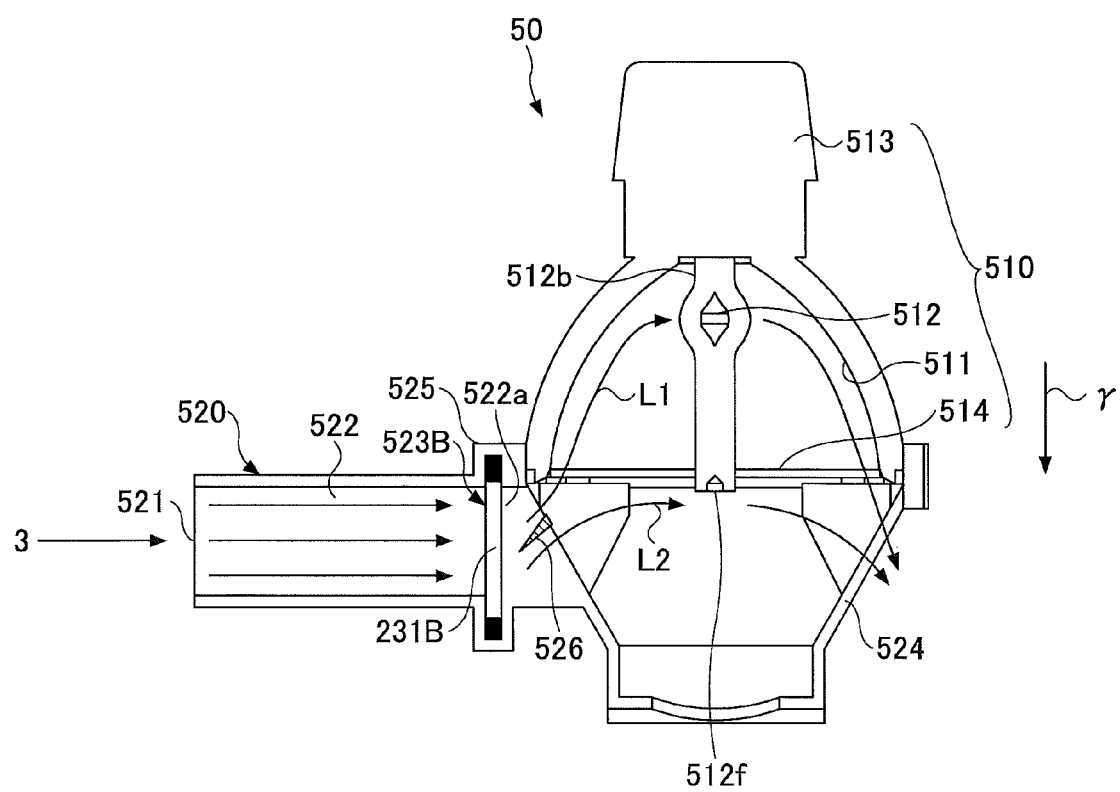
FIG. 16 is a horizontal sectional view of the light source device according to the embodiment.

FIG. 16 shows a horizontal cross-sectional view (plane cross section) of the light source device 50 in the normal projection state when the light source device 50 is viewed in a direction indicated by II in FIG. 11. The cross-section of the air guide plate 526 may have an inverted triangular shape. The air guide plate 526 may be disposed at a height position that is substantially equal to that of the opening 231B. In a plan view, with respect to a direction in which the cooling air flows, the air guide plate 526 may be arranged such that the air guide plate 526 is tilted by a predetermined angle from the projection direction γ. With such an arrangement, the air guide plate 526 can divide the cooling air into two separate streams, and the air guide plate 526 can guide the divided streams.

The cooling fan 3 can send the cooling air to the inlet port 521. The cooling air can flow in the flow channel 522, and the cooling air can be conveyed from the opening edge 522a of the flow channel 522 to the light emitting tube 512 of the light source 510. In this manner, the light emitting tube 512 can be cooled. At this time, after passing through the opening 231B at the upper side of the baffle plate 523B in the flow channel 522, the cooling air current can be divided into two streams L1 and L2 by the air guide plate 526. The stream L1 is an air current toward a base end portion 512b of the light emitting tube 512. The stream L2 is an air current toward a tip end portion 512f of the light emitting tube 512. Note that the divided cooling air currents are arranged so that each of the divided cooling air currents intensively applied to the upper portion of the light emitting tube 512.

The configuration according to this embodiment is a configuration that is designed by considering that an upper limit of the temperature is defined for the tip end portion 512f of the light emitting tube 512. A heating value at the tip end portion 512f is smaller than that of the light emitting tube 512. Thus, by adjusting the position and the angle of the air guide plate 526, the cooling air currents L1 and L2 are adjusted so that an amount of the cooling air current L1 is greater than an amount of the cooling air current L2. In this manner, the cooling air can be divided into proper amounts of the cooling air currents.

In FIG. 16, the embodiment is explained by using the normal projection state as an example. However, the similar configuration can be applied to the hanging projection state, and the same effect can be obtained for this configuration. Accordingly, illustrations and explanations of the hanging projection state are omitted.

As described above, the light source device 50 according to this embodiment has a configuration such that the shape of the opening 231B at the upper side of the baffle plate 523B is different from the shape of the opening 232B at the lower side of the baffle plate 523B. Namely, an opening area of the opening edge 522a of the flow channel 522 can be properly switched depending on the installation state of the image projection device 1. Accordingly, even if the flow of the cooling air in the flow channel 522 varies depending on the installation state of the image projection device 1, the flow of the cooling air can be controlled, and the cooling air can be properly guided toward the upper portion of the light emitting tube 512. In addition, because of the configuration that includes the air guide plate that is disposed in the vicinity of the opening edge 522a of the flow channel 522, the cooling air can be controlled by considering the upper limit of the temperature that is defined for the light emitting tube 512.

Another Embodiment

Figure 17:
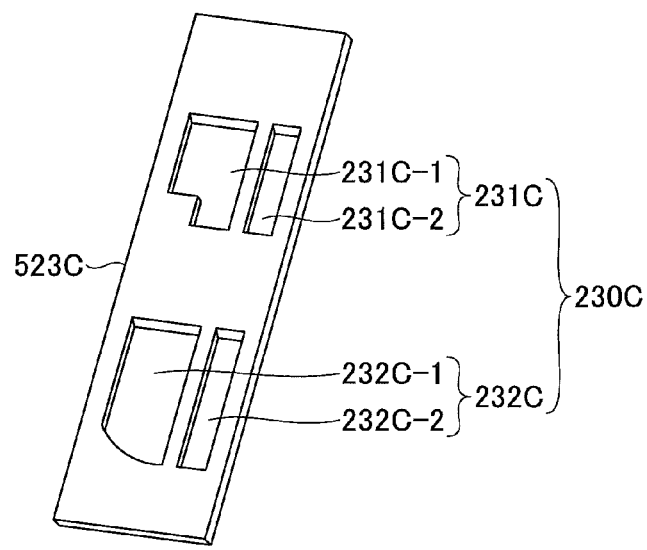
FIG. 17 is a perspective view showing an example of the baffle plate that is included in the light source device according to another embodiment.
Figure 18:
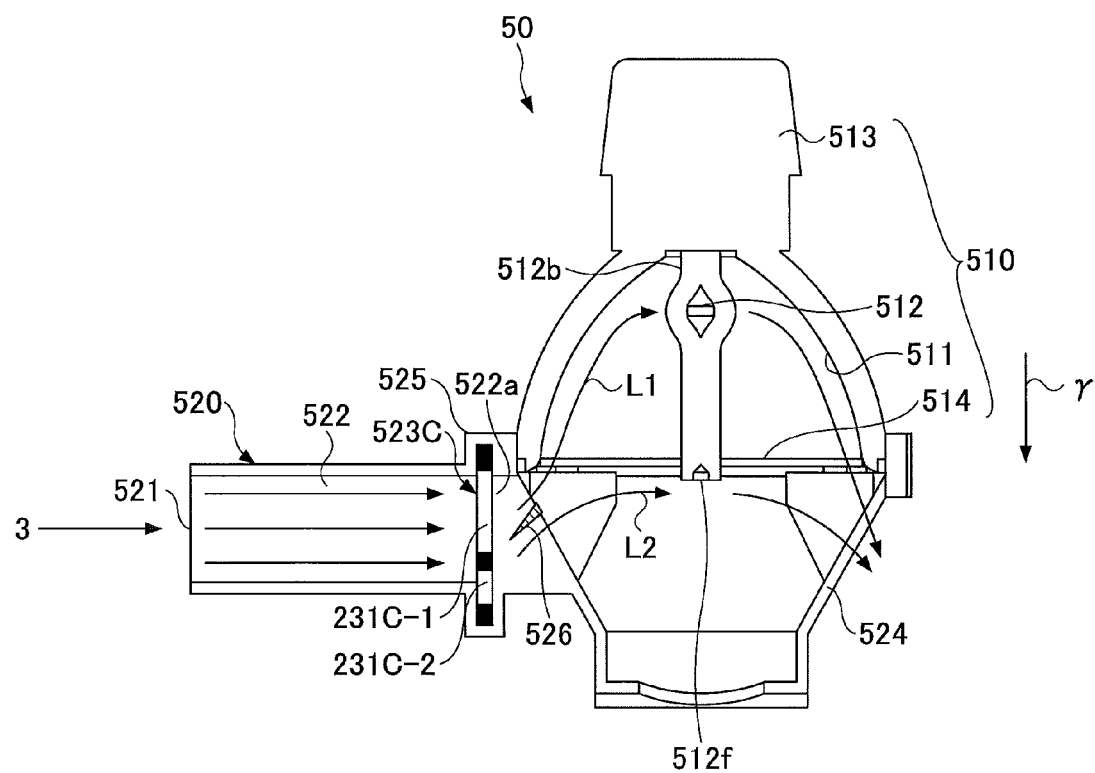
FIG. 18 is a horizontal sectional view of the light source device according to the embodiment.

Next, the light source device 50 according to another embodiment is explained by referring to FIGS. 17 and 18. The light source device 50 according to this embodiment may have substantially the same configuration as that of the above-described configuration. Thus, only the differences from the above-described configuration are explained. FIG. 17 is a perspective view showing a configuration of the baffle plate 523C. FIG. 18 shows a horizontal cross-sectional view of the light source device 50 in the normal projection state when the light source device 50 is viewed in the direction indicated by II in FIG. 11. It can be said that the light source device 50 according to this embodiment is also characterized in the cooling device 520.

The light source device 50 according to this embodiment is different from the above-described configuration in a baffle plate 523C that can be slid by its own weight in a direction that is perpendicular to the direction in which the flow channel 522 extends. Specifically, as shown in FIG. 17, a shape of an opening portion 230C of the baffle plate 523C is different. The baffle plate 523C that is shown in FIG. 16 may include an opening 231C at the upper side; and an opening 232C at the lower side. The opening 231C at the upper side can be divided into a left side opening 231C-1 (which corresponds to, a base end guide port) and a right side opening 231C-2 (which corresponds to a tip end guide port). The left side opening 231C-1 has a shape that is formed by leaving only the left side, with respect to the vertical line that passes through the center of the opening 231B, of the opening 231B that is shown in FIG. 15. The right side opening 231C-2 has a rectangular shape that is extended in the vertical direction. Thus, an aperture area of the left side opening 231C-1 is different from that of the right side opening 231C-2.

Similarly, the opening 232C at the lower side is divided into a left side opening 232C-1 and a right side opening 232C-2. The left side opening 232C-1 has a shape that is formed by leaving only the left side, with respect to the vertical line that passes through the center of the opening 232B, of the opening 232B that is shown in FIG. 15. The right side opening 232C-2 has a rectangular shape that is extended in the vertical direction. Thus, an aperture area of the left side opening 232C-1 is different from that of the right side opening 232C-2.

Similar to the above-described embodiment, after passing through the opening 231C at the upper side of the baffle plate 523C in the flow channel 522, the cooling air current can be divided into two streams L1 and L2 by the air guide plate 526. The stream L1 is an air current toward the base end portion 512b of the light emitting tube 512. The stream L2 is an air current toward the tip end portion 512f of the light emitting tube 512.

However, in this embodiment, the opening 231C (at the upper side) is divided into the left side opening 231C-1 and the right side opening 231C-2, and the aperture areas of the left side opening 231C-1 and the right side opening 231C-2 are different. Thus, as shown in FIG. 18, the opening 231C-1 can guide the cooling air to form the cooling air current L1 toward the base end portion 512b of the light emitting tube 512, and the opening 231C-2 can guide the cooling air to form the cooling air current L2 toward the tip end portion 512f of the light emitting tube 512. In this manner, the opening 231C-1 and the opening 231C-2 can adjust amounts of the corresponding cooling air currents.

By the light source device 50 according to this embodiment, a ratio between an amount of the cooling air current toward the base end portion 512b of the light emitting tube 512 and an amount of the cooling air current toward the tip end portion 512f can be properly and reliably adjusted, and accuracy of the cooling air control can be improved in which the upper limit of the temperature that is defined for the light emitting tube 512 is considered.

Another Embodiment

Figure 19:
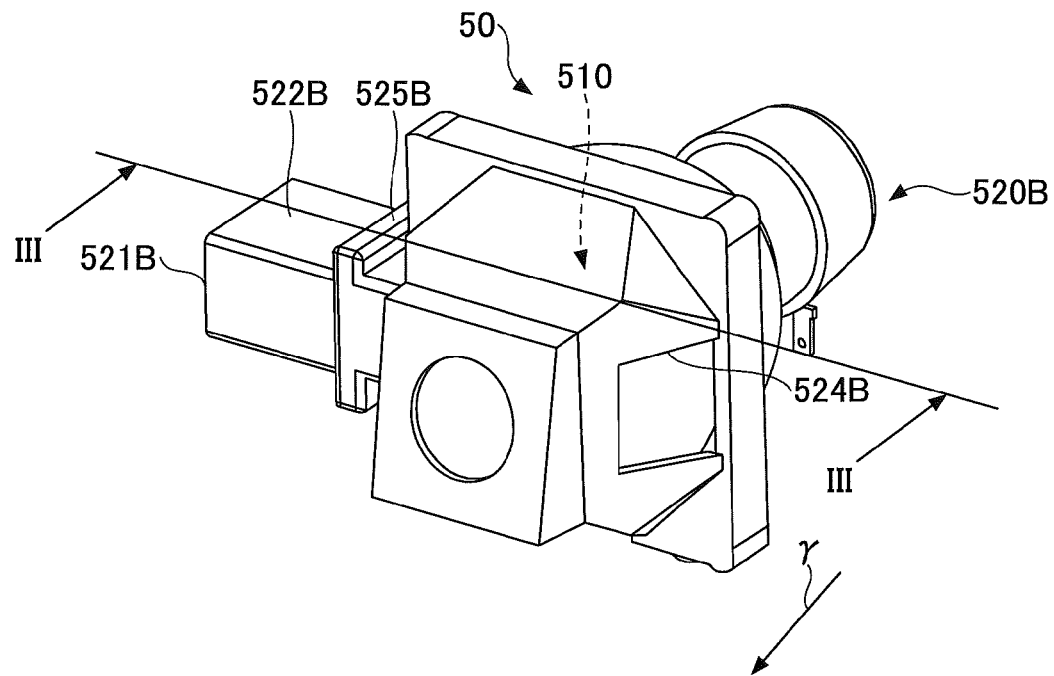
FIG. 19 is a front perspective view in the projection direction of the light source device according to another embodiment in the normal projection state.
Figure 20:
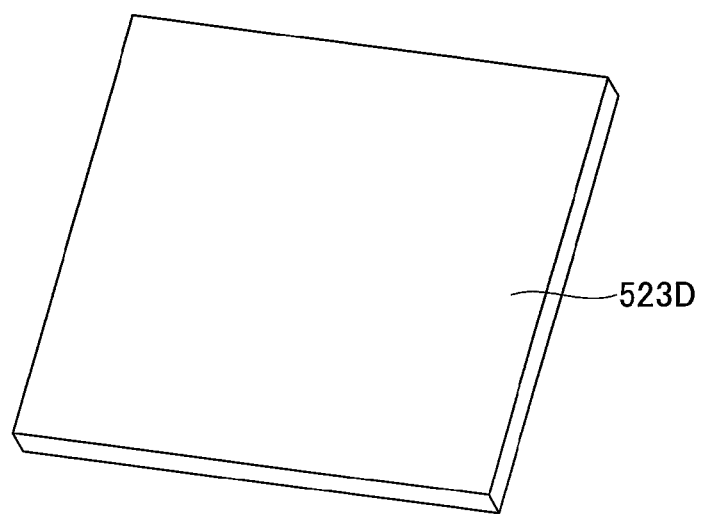
FIG. 20 is a perspective view showing an example of the baffle plate that is included in the light source device according to another embodiment.
Figure 21:
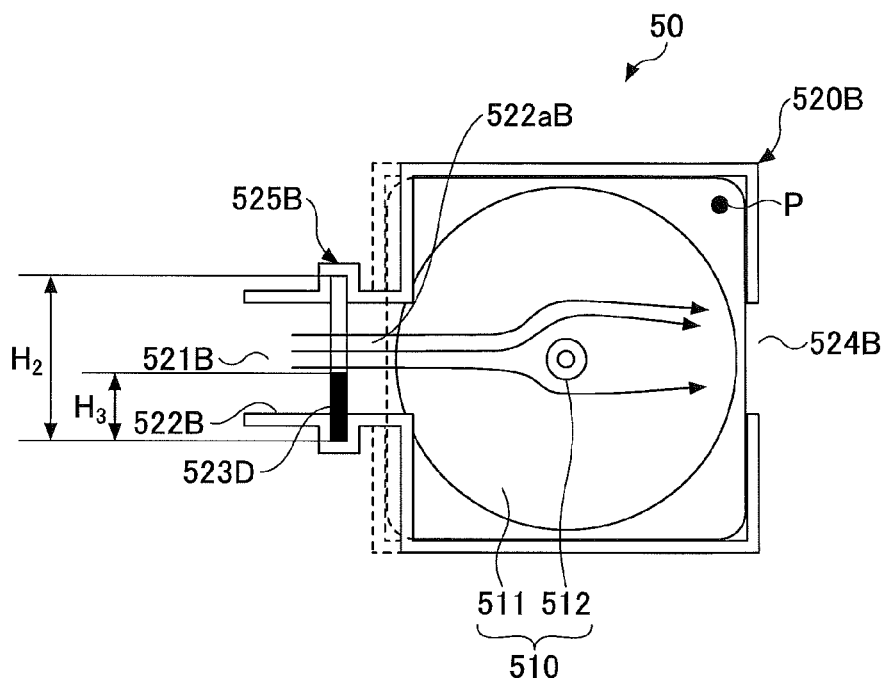
FIG. 21 is a vertical cross-sectional view of the light source device that is shown in FIG. 19 when the light source device is viewed in a direction indicated by III in FIG. 19.

Next, the light source device 50 according to another embodiment is explained by referring to FIGS. 19 to 21. FIG. 19 is a perspective view of the light source device 50 during the normal projection state. To be more precise, FIG. 19 is a perspective view of the light source device 50 that is viewed from a position in front of the light source device 50 in the projection direction γ. FIG. 20 is a perspective view showing a baffle plate 523D that is included in a cooling device 520B. FIG. 21 is vertical cross-sectional view of the light source device 50 in the normal projection state when the light source device 50 is viewed in a direction indicated by III in FIG. 19, that is, when the light source device 50 is viewed from a position in front of the light source device 50 in the projection direction γ. Note that the cooling device 520B that is included in the light source device 50 according to this embodiment is denoted as the "cooling device 520B," instead of the cooling device 520. That is because a portion of an external shape of the cooling device 520B is different from that of the cooling device 520.

The light source device 50 according to this embodiment may have substantially the same configuration as that of the above-described configuration. Thus, only the differences from the above-described configuration are explained. The baffle plate 523D that is included in the cooling device 520B according to this embodiment is different from the baffle plate 523 of FIG. 12 in that the height of the baffle plate 523D is substantially one-half of the height of the baffle plate 523.

FIG. 21 shows a support member 525B that can accommodate the above-described baffle plate 523D such that the baffle plate 523D can slid in the support member 525B. As shown in FIG. 21, the height H2 of the support member 525B can be designed to be small in accordance with the height H3 of the baffle plate 523D. Specifically, the height H2 of the support member 525B can be adjusted so that the baffle plate 523D can have the height H3 with which the baffle plate 523D can open the upper portion of an opening edge 522aB of a flow channel 522B at the side of the light emitting tube 512, and close the lower portion of the opening edge 522aB. When the height position of the baffle plate 523B is to be fine-tuned, a cushioning material may be provided on the bottom surface of the support member 525B, and the fine-tuning can be made by raising the height position of the baffle plate 523B. Alternatively, the fine-tuning can be made by providing the height adjustment unit for adjusting the position of the baffle plate 523B.

The baffle plate 523D does not include any opening. However, as shown in FIG. 21, when the image projection device 1 is installed in the normal projection state, the baffle plate 523D having the height of H3 closes the lower portion of the opening edge 522aB of the flow channel 522B, and at the same time, the baffle plate 523D leaves the upper portion of the opening edge 522aB open, thereby forming an opening. Thus, it can be said that the cooling device 520B according to this embodiment has substantially the same technical feature as that of the cooling device 520.

With the above-described configuration, the cooling fan 3 can send the cooling air to an inlet port 521B, the cooling air can flow inside the flow channel 522B, and the cooling air can be guided from the opening edge 522aB of the flow channel 522B to the light emitting tube 512 of the light source 510. In this manner, the light emitting tube 512 can be cooled.

At this time, as shown in FIG. 21, the cooling air can pass through the opening that is formed by the baffle plate 523D at the upper side of the opening edge 522aB of the flow channel 522B. Thus, among an amount of the cooling air that is conveyed to the light emitting tube 512, an amount of the cooling air that is guided to the upper side of the light emitting tube 512 (i.e., the side that is in a direction that is opposite to the direction of the gravity) is greater than an amount of the air that is guided to the lower side of the light emitting tube 512. Therefore, the upper portion of the light emitting tube 512 can be efficiently cooled compared to the lower portion of the light emitting tube 512.

Figure 22:
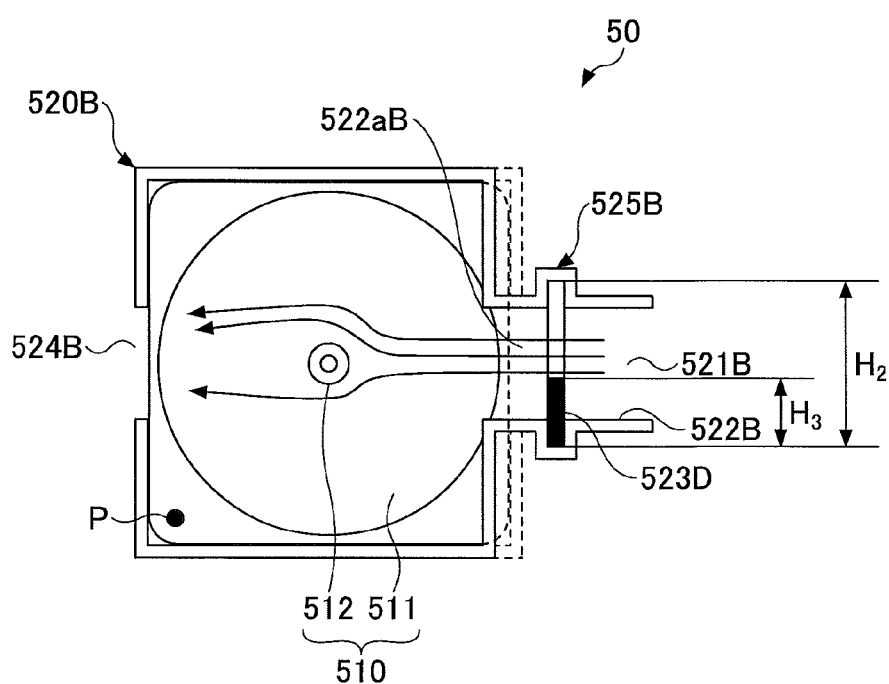
FIG. 22 is a vertical cross-sectional view of the light source device that is shown in FIG. 19 and that is in the hanging projection state when the light source device is viewed in the direction indicated by III in FIG. 19.

FIG. 22 shows the light source device 50 according to this embodiment when the image projection device 1 is installed in the hanging projection state. FIG. 22 is a vertical cross-ssectional view of the light source device 50 that is installed in the hanging projection state when the light source device 50 is viewed in the direction that is indicated by III in FIG. 19, that is, when the light source device 50 is viewed from a position in front of the light source device 50 in the projection direction γ.

The light source device 50 of FIG. 22 looks as if the light source device 50 of FIG. 21 were reversed in the horizontal direction. However, as it can be understood by focusing on the position of the mark P that indicates the top and bottom of the light source device 50, the light source device 50 of FIG. 22 is in the upside-down position relative to the position of the light source device 50 that is shown in FIG. 21, and FIGS. 21 and 22 show the same cross-section.

When the image projection device 1 is installed in the hanging projection state, the baffle plate 523D can be slid in the direction of the gravity (downward) by its own weight. Then, the baffle plate 523D is disposed at a position at which the baffle plate 523D forms the opening at the upper side of the opening edge 522aB of the flow channel 522B at the side of the light emitting tube 512, and at the same time, the baffle plate 523D closes the lower side of the opening edge 522aB.

The cooling fan 3 can send the cooling air to the inlet port 521B, the cooling air can flow inside the flow channel 522B, and the cooling air can be guided from the opening edge 522aB of the flow channel 522B to the light emitting tube 512 of the light source 510. In this manner, the light emitting tube 512 can be cooled.

At this time, the cooling air can pass through the opening that is formed by the baffle plate 523D at the upper side of the opening edge 522aB of the flow channel 522B. Thus, among an amount of the cooling air that is conveyed to the light emitting tube 512, an amount of the cooling air that is guided to the upper side of the light emitting tube 512 (i.e., the side that is in a direction that is opposite to the direction of the gravity) is greater than an amount of the air that is guided to the lower side of the light emitting tube 512. Therefore, the upper portion of the light emitting tube 512 can be efficiently cooled compared to the lower portion of the light emitting tube 512.

In the light source device 50 according to this embodiment, the height of the baffle plate 523D is minimized and the height of the support member 525B is also reduced. Thus, according to this embodiment, downsizing of the cooling device 520B of the light source device 50 can be achieved. Note that this embodiment may be effective for the light source 510 having a wide operating temperature range.

Another Embodiment

Next, the light source device 50 according to another embodiment is explained. The light source device 50 according to this embodiment may have substantially the same configuration as that of the previous embodiment. Thus, only the differences from the above-described configuration are explained. It can be said that the light source device 50 according to this embodiment is also characterized in the cooling device 520B.

Figure 23:
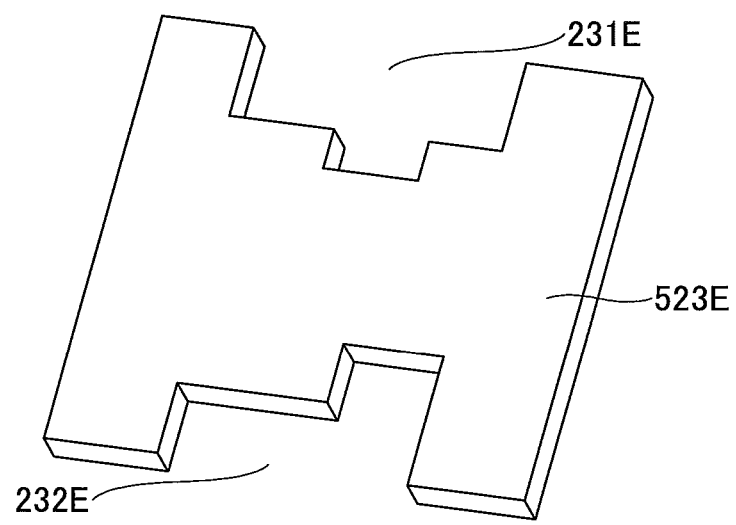
FIG. 23 is a perspective view showing an example of the baffle plate that is included in the light source device according to another embodiment.

The cooling device 520B according to this embodiment is different from that of the previous embodiment in the configuration of the baffle plate 523E. The baffle plate 523E can be slid in a direction that is perpendicular to the direction in which the flow channel 522B of the cooling device 520B extends. Specifically, as shown in FIG. 23, the upper edge portion of the baffle plate 523E has a recessed portion 231E that includes a step portion, and the lower edge portion of the baffle plate 523E includes a recessed portion 232E having a step portion.

The shape of the recessed portion 231E can be different from that of the recessed portion 232E. Namely, the baffle plate 523E can have a configuration such that an opening area of the opening edge 522aB of the flow channel 522B can be varied depending on the installation state of the image projection device 1.

The baffle plate 523E according to this embodiment has a configuration such that the upper edge includes the recessed portion 231E and the lower edge includes the recessed portion 232E, and the shapes of the recessed portions 231E and 232E can be different. Since the shapes of the recessed portions 231E and 232E are designed by considering the flow of the cooling air in the flow channel 522B that can vary depending on the installation position of the image projection device 1, the upper portion of the light emitting tube 512 can be efficiently cooled.

Further Embodiment

Hereinafter, the image projection device 1 is explained that includes the light source device 50 according to any one of the above-described embodiments.

As explained by referring to FIGS. 1-8, the image projection device 1 may include, at least, the cooling fan 3; the controller 4; the light source unit 5; and the optical engine 6. Details of these components are explained above. The image projection device 1 may include the light source device 50 according to any one of the embodiments. Further, the image projection device 1 may include the light source device 50 that includes the cooling device 520 (or 520B) according to any one of the embodiments; and the baffle plate 523 (or 523B, 523C, or 523D) according to any one of the embodiments.

Thus, the image projection device 1 can include the light source device 50 whose type, size, and performance are optimized for the image projection device 1. Therefore, the image projection function of the image projection device 1 can be enhanced.

The light source device and the image projection device are explained above by the embodiments. However, the present invention is not limited to the above-described embodiments, and various variations and modifications may be made without departing from the scope of the claims. The above-described embodiments are described for facilitating understanding of the present invention, and are not intended to limit the present invention in any way. Note that the above-described embodiments are not mutually exclusive. Thus, an item described in one of the embodiments can be combined with another item described in another one of the embodiments, provided that they do not contradict.

The present application is based on and claims the benefit of priority of Japanese Priority Application No. 2014-126151 filed on Jun. 19, 2014, the entire contents of which are hereby incorporated herein by reference.

What is claimed is:

1. A light source device comprising:
a light source that includes a light emitting tube; and
a cooler configured to cool the light emitting tube,
wherein the cooler includes
an inlet port configured to draw cooling air for cooling the light emitting tube;
a flow channel that extends from the inlet port to the light emitting tube in a horizontal direction and that is for flowing the cooling air toward the light emitting tube;
a baffle plate that is disposed in the flow channel and that is configured to slide in a gravity direction that is perpendicular to the direction in which the flow channel is extended; and
a support member that is disposed in a vicinity of an opening edge of the flow channel at a side of the light emitting tube, the support member protruding perpendicular to the direction in which the flow channel is extended,
wherein the baffle plate has a shape and openings such that, in an installation state, an upper portion of the flow channel is opened and a lower portion of the flow channel is closed by the shape and positions of the openings of the baffle plate, and
wherein the baffle plate is accommodated in the support member, and the support member is configured such that, upon the light source device being placed upside-down, the support member supports the baffle plate, so that the baffle plate is allowed to slide in the support member in the gravity direction.

2. The light source device according to claim 1,
wherein the openings of the baffle plate are disposed at an upper side and a lower side of the baffle plate, respectively, and
wherein one of the openings at the upper side and at the lower side that corresponds to the installation state of the light source device is disposed at a position at which the one of the openings opens the upper portion of the flow channel and closes the lower portion of the flow channel.

3. The light source device according to claim 2, wherein a shape of the opening at the upper side is different from a shape of the opening at the lower side.

4. The light source device according to claim 1, wherein each of the openings includes a base end guide port for guiding the cooling air toward a base end side of the light emitting tube, and a tip end guide port for guiding the cooling air toward a tip end side of the light emitting tube.

5. The light source device according to claim 1, wherein the support member has a height that allows the baffle plate to be disposed at a position at which one of the openings of the baffle plate opens an upper portion of the opening edge of the flow channel at the side of the light emitting tube and the baffle plate closes a lower portion of the opening edge of the flow channel at the side of the light emitting tube.

6. An image projection device comprising:
a light source device;
a cooling fan configured to supply cooling air to a cooler; and
an optical engine configured to guide light that is emitted from the light source device toward a screen,
wherein the light source device includes
a light source that includes a light emitting tube; and
the cooler configured to cool the light emitting tube,
wherein the cooler includes
an inlet port configured to draw the cooling air for cooling the light emitting tube;
a flow channel that extends from the inlet port to the light emitting tube in a horizontal direction and that is for flowing the cooling air toward the light emitting tube; and
a baffle plate that is disposed in the flow channel and that is configured to slide in a gravity direction that is perpendicular to the direction in which the flow channel is extended; and
a support member that is disposed in a vicinity of an opening edge of the flow channel at a side of the light emitting tube, the support member protruding perpendicular to the direction in which the flow channel is extended,
wherein the baffle plate has a shape and openings such that, in an installation state, an upper portion of the flow channel is opened and a lower portion of the flow channel is closed by the shape and positions of the openings of the baffle plate, and
wherein the baffle plate is accommodated in the support member, and the support member is configured such that, upon the image projection device being placed upside-down, the support member supports the baffle plate, so that the baffle plate is allowed to slide in the support member in the gravity direction.

* * * * *